United States Patent [19]

Hasselmann

[11] Patent Number: 5,072,621
[45] Date of Patent: Dec. 17, 1991

[54] PIPELINE LEAK DETECTOR APPARATUS AND METHOD

[76] Inventor: Detlev E. M. Hasselmann, 519 South Nardo, Solana Beach, Calif. 92075

[21] Appl. No.: 543,355

[22] Filed: Jun. 25, 1990

[51] Int. Cl.$^5$ .............................................. G01M 3/08
[52] U.S. Cl. ................................. 73/40.50 R; 73/49.1
[58] Field of Search .................. 73/40.5 R, 49.1, 49.5, 73/49.2 R

[56] References Cited

U.S. PATENT DOCUMENTS

| | | | |
|---|---|---|---|
| 3,793,876 | 2/1974 | Oswald | 73/49.2 R |
| 3,940,020 | 2/1976 | McCrory et al. | 73/40.5 R |
| 3,978,709 | 9/1976 | Ando | 73/40.5 R |
| 4,043,355 | 8/1977 | Cerruti et al. | 73/40.5 R |
| 4,942,758 | 7/1990 | Cofield | 73/49.2 R |

OTHER PUBLICATIONS

Wolff, Nancy D., Service Station Pipeline Leak Detectors (1988).

*Primary Examiner*—Robert Raevis
*Assistant Examiner*—Shu-Cheng Kau
*Attorney, Agent, or Firm*—Baker, Maxham, Jester & Meador

[57] ABSTRACT

A method for detecting leaks in a fluid pipeline where the pressure supply pump remains ON during the test procedure and pressure on both sides of a closed shut-off valve in the pipeline is maintained equal. A novel flow meter is provided comprising a parallel combination of a solenoid value and a pressure differential switch connected across the shut-off valve.

16 Claims, 2 Drawing Sheets

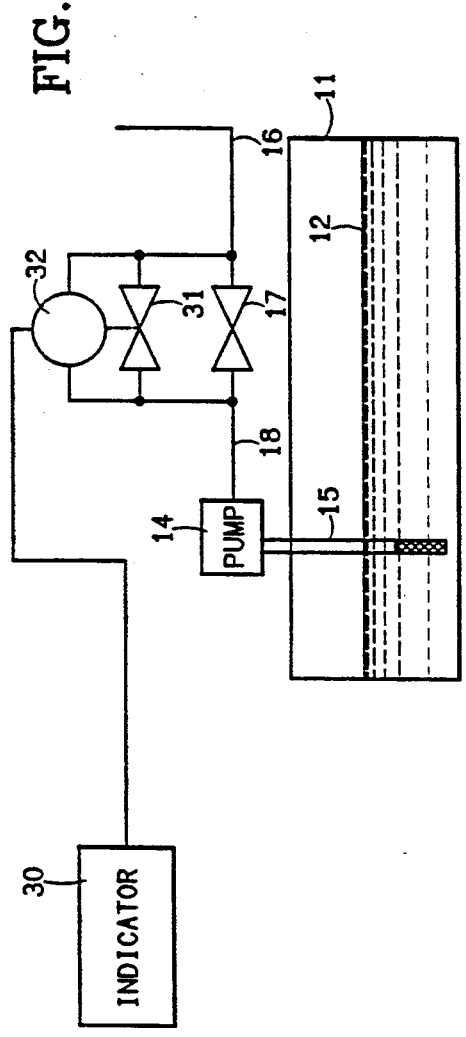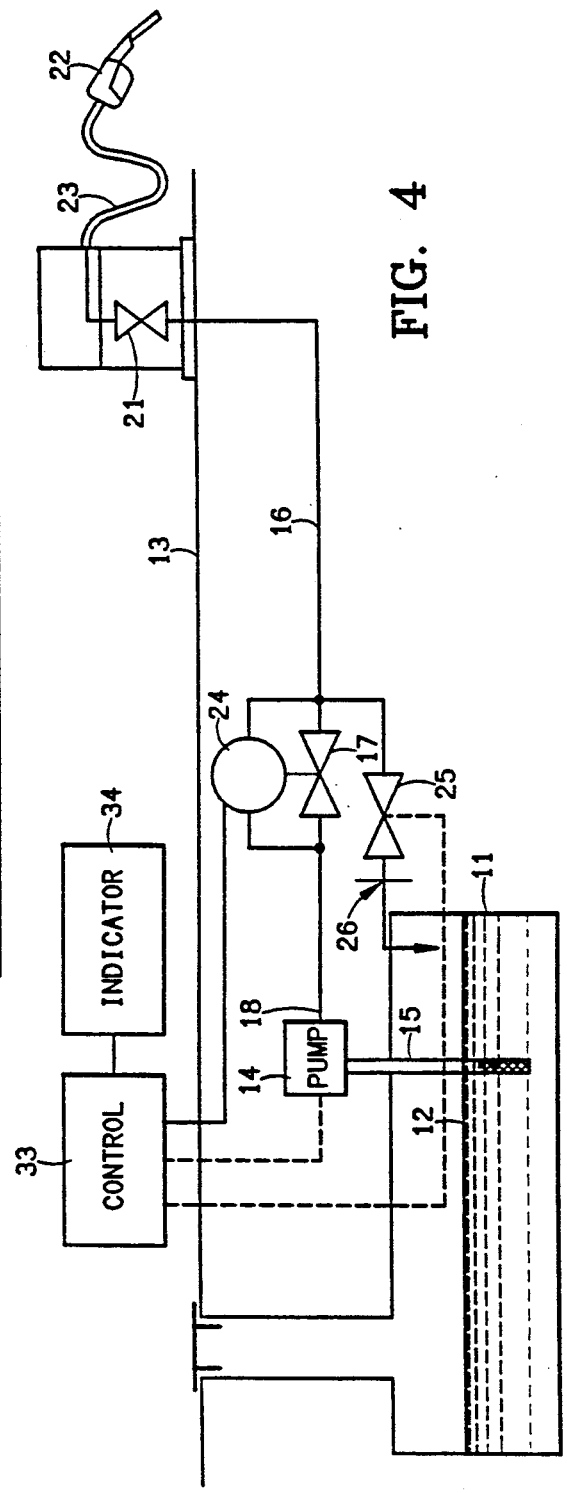

PIPELINE LEAK DETECTOR APPARATUS AND METHOD

FIELD OF THE INVENTION

This invention relates generally to leak detectors and more particularly to a method and apparatus for detecting very small leaks, that is, the leak rates which are so low as to be undetectable by a conventional flow meter.

BACKGROUND OF THE INVENTION

Increasing environmental awareness and respect for valuable natural resources has created an abiding concern in the area of underground leak detection. This is especially true with regard to fuel tank storage and dispensing systems. The industry has been continuously in search of new technologies and enhancements to existing technologies for underground leak detection, particularly pipeline leak detection.

Conventional leak detection methods for pipelines involve pressurizing the line and then observing a pressure decay when there is a leak. This method is subject to false readings due to temperature changes of the pressurized liquid caused by heating or cooling from the environment. A small temperature change, specifically a reduction in temperature, can cause a large change in pressure of liquid, which is, for most purposes, incompressible. In pipelines, where a relatively few number of gallons of liquid may be involved, a very small amount of liquid volume, that is, flow, causes a large change in pressure. For example, a typical gasoline station may have 120 feet of pipe connected to one storage tank. There may be about 20 gallons of fuel in that length of pipe. A one-degree F reduction in liquid temperature at a typical temperature coefficient of expansion results in a detectable reduction in pressure. However, that one degree of temperature reduction results in a volume change of only 0.014 gallons of liquid.

Attempts to use currently available flow meters or flow sensors have been satisfactory for some purposes but they are insufficiently accurate to detect fluid flow at the minimum level required by the Environmental Protection Agency with respect to fuel storage and dispensing systems. This minimum level is currently 0.1 gallon per hour and any leak detection system for either fuel tanks or piping which does not achieve this minimum detection level will not be acceptable.

The apparent leak rate of 0.014 gallons per hour, if the one degree F reduction took place over the course of one hour, would be undetectable by a conventional flow meter. By way of further example, a leak rate of 0.1 gallon per hour amounts to only two drops per second. That is below the threshold leak rate detectable by currently available flow meters which themselves typically leak at more than two drops per second.

The description of some of the prior art pipeline leak detectors is set forth in a paper entitled "Service Station Pipeline Leak Detectors," by N.D. Wolff, presented at the Underground Storage Tank Leak Prevention Seminars conducted by the California State Water Resources Control Board in July and Aug. 1988. This describes some of the pressure related leak detectors and some of the alternative leak detector devices.

SUMMARY OF THE INVENTION

Broadly speaking, this invention overcomes the temperature-related deficiency of the pressure decay type devices by maintaining a constant supply pressure and measuring the flow caused by a leak in a pipeline, however low the leak rate. This invention provides significantly greater accuracy than has been previously available and can detect leak rates at any level, well below 0.1 gallons per hour.

The basic invention comprises a shut-off valve positioned in the main pipeline between the dispenser valve and the pump. A flow meter is connected to the main line in parallel with the shut-off valve. Testing is accomplished by energizing the pump to create fluid pressure in the pipeline with the dispenser valve closed. As soon as delivery pressure is achieved in the pipeline, the shut-off valve is closed and the flow meter indicates whether or not there is flow past the shut-off valve caused by liquid loss due to a pipeline leak.

In an alternative embodiment, a flow meter verification device is added which includes a valve having one end connected to the main line between the shut-off valve and the dispenser valve, and an orifice having a predetermined flow rate at the dispensing pressure connected to the other end of the verification valve. To determine whether or not the flow meter is operating properly, a leak is simulated by opening the verification valve and allowing flow through the orifice and back into the tank. If the flow meter indicates a leak, it will indicate that all aspects of the leak detector are operating properly.

Another alternative embodiment provides a new flow meter apparatus which is coupled in the same position across the shut-off valve and comprises a solenoid valve connected across the shut off valve. A pressure differential switch is connected in parallel with the solenoid valve and controls operation of the valve. The valve is normally closed and is opened under the influence of the pressure differential switch when there is a pressure differential across the shut-off valve. This last embodiment is particularly adept at measuring extremely small leaks. This flow meter has no flow until there is a slight pressure differential across the solenoid valve and, commensurately, across the shut-off valve. When the pressure switch detects a difference, the solenoid valve is opened to immediately equalize the pressure. By measuring the time the valve is open it is possible to calculate the flow through the solenoid valve and thereby calculate the leak rate in the pipeline.

Note that in all of these processes, the main pump remains ON, supplying pressure to the shut-off valve and to the main pipeline.

BRIEF DESCRIPTION OF THE DRAWING

The objects, advantages and features of the invention will be more clearly perceived from the following detailed description, when read in conjunction with the accompanying drawing, in which:

FIG. 3 is similar to FIG. 2 showing yet another alternative embodiment; and

FIG. 4 shows an automated embodiment of the invention.

DESCRIPTION OF THE PREFERRED EMBODIMENTS

Figure 1:
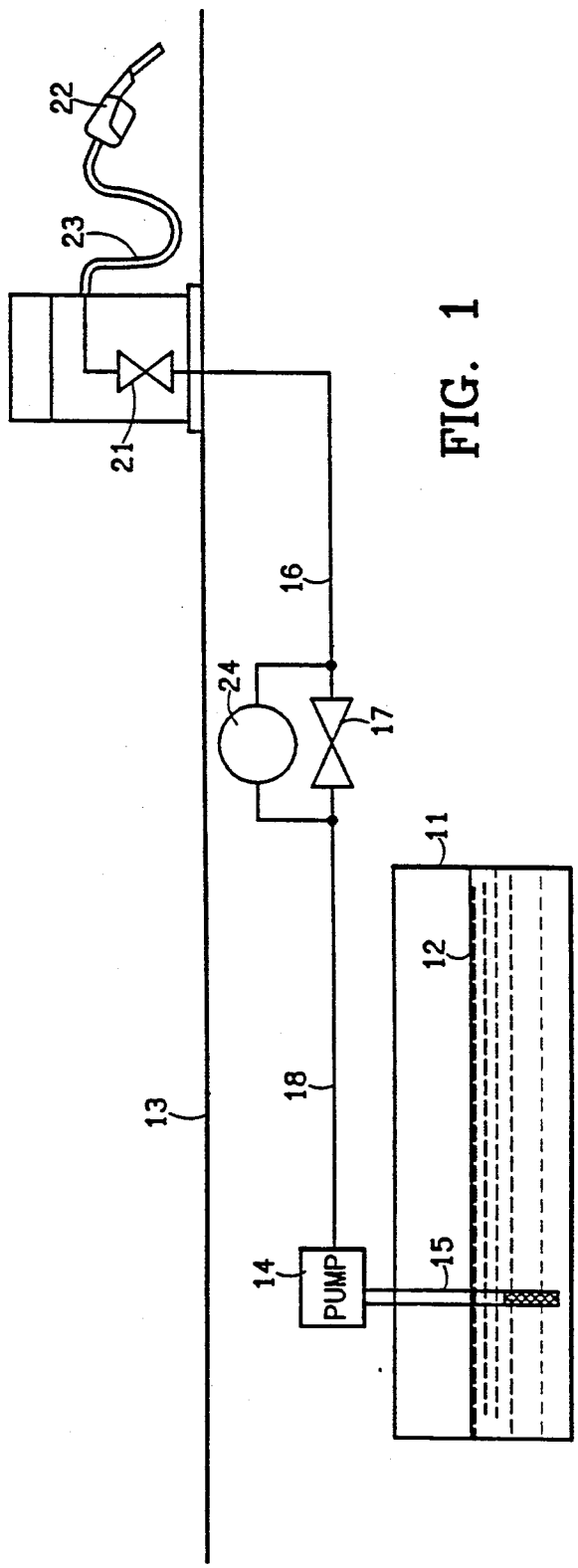
FIG. 1 depicts the basic pipeline leak detector apparatus of the invention.

With reference now to the drawing, and more particularly to FIG. 1 thereof, there is shown tank 11 buried beneath ground grade level 13. The tank is filled to liquid level 12. Pump 14, which may be a submersible pump in tank 11, delivers liquid from the tank through lines 15 and 18 to main pipeline 16 in which is connected shut-off valve 17. At the end of pipeline 16 is dispenser valve 21 from which dispensing nozzle 22 and hose 23 are connected. There may be several such dispensing valves and nozzles. Also connected in pipeline 16 across valve 17 is flow sensor 24.

The process of determining pipeline leaks commences with closing dispenser valve 21 and energizing pump 14. In a very short time delivery pressure will have been achieved in pipeline 16, at which time shut-off valve 17 is closed. Pump 14 remains ON during the leak testing process. If flow meter 24 indicates no flow, it can be assumed that there is no product loss in pipeline 16 due to a leak. It may be necessary to wait several minutes in the event that there is cooling of the liquid in the pipeline so that temperature reductions do not contaminate the readings. Such cooling might occur due to a cold ground environment and a warmer product which could have been caused by pump heat and compression. This cooling would cause the liquid to compress slightly thereby reducing the pressure in pipeline 16. Because the flow sensor responds to changes in pressure on either side of valve 17, a reduction in pressure in main pipeline 16 will cause fluid from charged pump 14 to flow through the flow meter and thereby stabilize the pressure. The flow meter includes an indicator device such as a dial or a digital readout to show flow rate, typically in gallons per hour.

Figure 2:
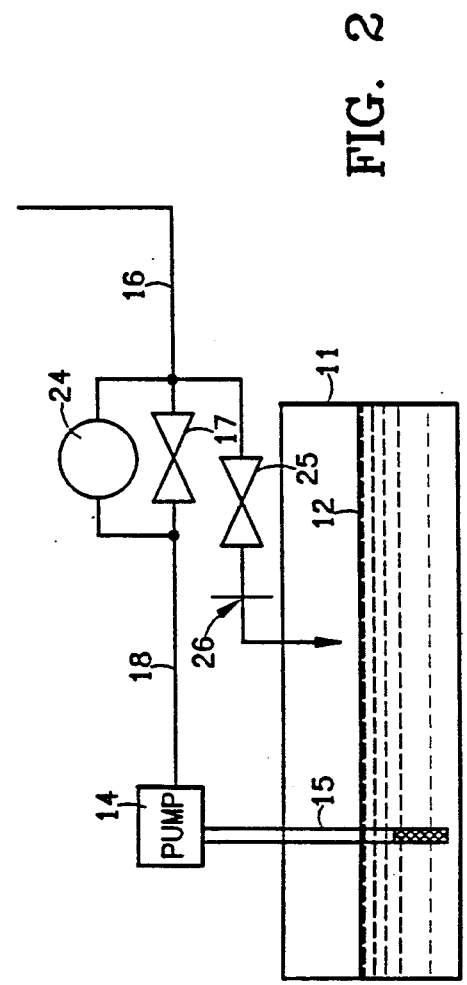
FIG. 2 shows a portion of FIG. 1 with an alternative arrangement.

It is possible that the flow meter could be stuck and thereby not indicate when a flow takes place or should take place. In order to check or verify the performance of the flow meter, leak simulation apparatus as shown in FIG. 2 may be provided. Verification valve 25 is connected in pipeline 16, which is on the downstream side of shut-off valve 17. The opposite end of valve 25 is connected to line 26 which includes therein an orifice which has a predetermined flow rate at dispensing pressure. Line 26 leads back to tank 11. With dispensing valve 21 and shut-off valve 17 closed and the system in a quiescent condition, it may be desired, especially at the beginning or end of the day, to check the operability of the flow meter. Valve 25 is opened so that liquid flows through line 26 back to the storage tank. This causes a flow in flow meter 24, indicating a leak. It may be desired to cycle valve 25 open and closed so that it can be clearly determined that flow meter 24 shows a corresponding leak/no leak condition.

This cycling of valve 25 is employed to check for proper operation of the entire leak detecting system. If any of the valves or sensors are not operating properly, flow meter 24 will not switch between the ON and OFF positions as solenoid valve 25 is opened and closed.

Another embodiment, comprising an improved flow meter, is shown in FIG. 3. This embodiment comprises solenoid valve 31 connected in parallel with pressure differential switch 32, both of which are connected in parallel with shut-off valve 17 as before. Indicator 30 visually shows such parameters as the length of time valve 31 was open and the amount of fluid that passed therethrough. This structure car measure extremely small leak rates, effectively down to zero. As soon as there is a slight leak, a pressure differential exists between lines 16 and 18, effectively across the parallel combination of valve 31 and switch 32. Until that time there is no flow around valve 17. The pressure differential switch senses a small pressure drop, as low as two to five inches of water (0.072-0.181 psi), and opens valve 31. Since pump 14 continues to operate, this immediately equalizes the pressure and pressure switch 32 again closes valve 31.

The automated version of the invention is shown in FIG. 4. Control system 33 is electrically connected to flow meter 24 which may be any flow meter, including the embodiment of FIG. 3. It is also connected to pump 14 for control of and detecting duration time of operation thereof. By measuring the time the flow meter, which comprises solenoid valve 31 and pressure switch 32, remains open, it is possible to calculate the amount of flow through the flow meter. For example, if valve 31 remains ON for 10 seconds, it will represent 10 times as much flow as for a one second ON time. After two or three readings over a predetermined period of time, it is simple for control 33 to calculate the flow rate. If the flow rate exceeds a predetermined minimum level, indicator 34 will show a leak or a "Fail" indication. Otherwise a "Pass" or no leak indication will appear on indicator 34. Control system 33 includes appropriate means for establishing a leak rate above which the pipeline system fails, that is, a flow rate set point. It also measures flow time, and integrates a series of calculations over a predetermined period of time to determine total flow and flow rate through the flow sensor.

It can be seen that the principle of operation of the leak detector of this invention is to maintain pressure on main line 16 and measure the volume of fluid necessary over a measured period of time to maintain that pressure. This requires that the main fuel delivery pump remain on during the leak test procedure. This apparatus is so sensitive that it can detect leak rates at least as low as 0.05 gallon per hour, which is equivalent to one drop per second.

In view of the above description, it is likely that modifications and improvements will occur to those skilled in the art which are within the scope of the accompanying claims.

What is claimed is:

1. Pipeline leak detector apparatus comprising:
   a liquid containing tank;
   dispenser valve means remote from said tank;
   liquid conduit means connected between the interior of said tank and said dispenser valve means;
   shut-off valve means in said conduit means intermediate said tank and said dispenser valve means;
   pump means coupled in said conduit means on the tank side of said shut-off valve means and configured to apply fluid under pressure to said liquid conduit means and said dispenser valve means; and
   flow meter means connected in said conduit means in parallel with said shut-off valve means, said flow meter means and said shut-off valve means being a parallel combination in series with said pump means, said flow meter means being configured to maintain equal pressure on both sides of said shut-off valve means and to indicate any liquid flow therethrough.

2. The apparatus recited in claim 1, and further comprising:
   flow meter verification valve means having an input side and an output side, said input side being connected to said conduit means intermediate said shut-off valve means and said dispenser valve means; and orifice means in said conduit means connected to said output side of said verification valve means, said orifice means having a predetermined fluid flow rate therethrough.

3. The apparatus recited in claim 1, wherein said flow meter means comprises:
   flow meter valve means connected in said conduit means in parallel with said shut-off valve means;
   pressure differential switch means connected in parallel with said flow meter valve means; and
   means for operatively coupling said switch to said flow meter valve means to open and close said flow meter valve means in response to pressure changes in said liquid conduit means.

4. The apparatus recited in claim 3, and further comprising:
   means for monitoring flow detected by said flow meter means for a predetermined period of time;
   means for establishing a predetermined flow rate set point;
   means for determining rate of flow through said flow meter means; and
   indicator means for indicating that the conduit means has met the predetermined flow rate or has failed to meet the predetermined flow rate.

5. The apparatus recited in claim 1, and further comprising indicator means for indicating liquid flow through said flow meter means.

6. The apparatus recited in claim 1, and further comprising:
   means for monitoring flow detected by said flow meter means for a predetermined period of time;
   means for establishing a predetermined flow rate set point;
   means for determining rate of flow through said flow meter means; and
   indicator means for indicating that the conduit means has met the predetermined flow rate or has failed to meet the predetermined flow rate.

7. A method for detecting leaks in a pipeline, the pipeline being connected between a liquid containing tank and a dispenser valve, there being a pump to apply the liquid under pressure to the pipeline, a shut-off valve in the pipeline between the pump and the dispenser valve, and a flow meter connected in the pipeline in parallel with the shut-off valve, the combination of the flow meter and the shut-off valve being in series with the pump, said method comprising the steps of:
   closing the dispenser valve;
   energizing the pump to apply liquid under pressure to the pipeline; then
   closing the shut-off valve while maintaining the pump energized; and then
   determining whether or not there is liquid flow through the flow meter.

8. The method recited in claim 7, and comprising the further steps of:
   connecting the input side of a flow meter verification valve in the pipeline;
   connecting an orifice to the output side of said verification valve;
   opening the verification valve to create an artificial leak; and
   determining whether or not the flow meter indicates flow when the verification valve is open.

9. The method recited in claim 8, wherein the verification valve is cycled open and closed to create an artificial leak to verify flow and no-flow conditions of the flow meter.

10. The method recited in claim 7, wherein the flow meter is formed of a flow meter valve and pressure differential switch connected in parallel, the switch operatively controlling the opening and closing of the flow meter valve, said flow determining step comprising the steps of:
    sensing pressure reduction in the pipeline by means of the pressure differential switch;
    opening the flow meter valve to equalize the pressure on both sides of the shut-off valve;
    measuring the length of time the flow meter valve stays on; and
    calculating the amount of flow through the flow meter valve.

11. The method recited in claim 10, and comprising the further steps of:
    integrating a plurality of calculations of the amount of flow through the flow meter valve over a measured period of time; and
    calculating the leak rate of the pipeline.

12. The method recited in claim 10, and comprising the further steps of:
    monitoring liquid flow detected by the flow meter for a predetermined period of time;
    establishing a predetermined flow rate set point; determining rate of flow through said flow meter; and
    indicating whether or not the flow through the flow meter is below said set point.

13. The method recited in claim 7, and comprising the further steps of:
    monitoring liquid flow detected by the flow meter for a predetermined period of time;
    establishing a predetermined flow rate set point;
    determining rate of flow through said flow meter; and
    indicating whether or not the flow through the flow meter is below said set point.

14. The method recited in claim 7, and comprising the further step of maintaining equal pressure of both sides of the shut-off valve by keeping the flow meter closed when there is no pressure differential across the shut-off valve and opening the flow meter to equalize the pressure in response to a pressure differential.

15. Pipeline leak detector apparatus comprising:
    a liquid containing tank;
    dispenser valve means remote from said tank;
    liquid conduit means connected between the interior of said tank and said dispenser valve means;
    shut-off valve means in said conduit means intermediate said tank and said dispenser valve means;
    pump means coupled in said conduit means on the tank side of said shut-off valve means and configured to apply fluid under pressure to said liquid conduit means and said dispenser valve means; and
    flow meter means connected in said conduit means in parallel with said shut-off valve means, said flow meter means indicating any liquid flow therethrough.

16. The apparatus recited in claim 15, wherein said flow meter means is normally closed and opens in response to the pressure differential across said shut-off valve means to thereby maintain equal pressure on both sides of said shut-off valve means.

* * * * *